(12) United States Patent
Brandner et al.

(10) Patent No.: US 9,472,816 B2
(45) Date of Patent: Oct. 18, 2016

(54) MOLDED PART

(75) Inventors: Marco Brandner, Oy-Mittelberg (DE); Oliver Hirsch, Reutte (AT); Wolfgang Kraussler, Weissenbach (AT); Thomas Leiter, Reutte (AT)

(73) Assignee: Plansee SE, Reutte (AT)

( * ) Notice: Subject to any disclaimer, the term of this patent is extended or adjusted under 35 U.S.C. 154(b) by 274 days.

(21) Appl. No.: 14/234,037

(22) PCT Filed: Jul. 18, 2012

(86) PCT No.: PCT/AT2012/000191
§ 371 (c)(1),
(2), (4) Date: Feb. 10, 2014

(87) PCT Pub. No.: WO2013/010198
PCT Pub. Date: Jan. 24, 2013

(65) Prior Publication Data
US 2014/0147692 A1   May 29, 2014

(30) Foreign Application Priority Data

Jul. 21, 2011  (AT) .............................. GM412/2011

(51) Int. Cl.
| B21C 37/02 | (2006.01) |
| H01M 8/02 | (2016.01) |
| B22F 5/08 | (2006.01) |
| B22F 3/02 | (2006.01) |
| B22F 3/12 | (2006.01) |

(Continued)

(52) U.S. Cl.
CPC .............. *H01M 8/0247* (2013.01); *B22F 3/02* (2013.01); *B22F 3/12* (2013.01); *B22F 5/00* (2013.01); *B22F 5/06* (2013.01); *B22F 5/08* (2013.01); *H01M 8/021* (2013.01); *H01M 8/0206* (2013.01); *H01M 8/026* (2013.01); *B22F 2998/10* (2013.01); *Y02E 60/50* (2013.01); *Y10T 428/12201* (2015.01)

(58) Field of Classification Search
None
See application file for complete search history.

(56) References Cited

U.S. PATENT DOCUMENTS

| 7,390,456 B2 | 6/2008 | Glatz et al. |
| 8,657,634 B2 | 2/2014 | Bootle et al. |
| 8,753,785 B2 * | 6/2014 | Brandner .................. B22F 3/02 |
| | | 264/618 |

(Continued)

FOREIGN PATENT DOCUMENTS

| AT | 11799 U1 | 5/2011 |
| CN | 102044790 A | 5/2011 |

(Continued)

*Primary Examiner* — Daniel J Schleis
(74) *Attorney, Agent, or Firm* — Laurence A. Greenberg; Werner H. Stemer; Ralph E. Locher

(57) ABSTRACT

A powder metallurgical molded part includes a disk or plate-like main body and a row of knob-shaped and/or ridge-shaped elevations in a row direction having a height perpendicular to a main plane of the main body and a cross section with side flanks leading from an outer end contour in height direction of the elevation via rounded corner portions into curved portions with a curve radius. The curve radius merges into the surface contour of the main body and a rectilinear flank portion or tangent of the side flank lying at the point where the rounded corner portion merges into the curved portion is disposed at an angle of inclination to the main plane. At least two different angles of inclination are on the same side of the main body and the at least two different angles of inclination represent at least first and second geometries.

16 Claims, 4 Drawing Sheets

(51) Int. Cl.
   *B22F 5/00*      (2006.01)
   *B22F 5/06*      (2006.01)

(56) References Cited

U.S. PATENT DOCUMENTS

| | | | |
|---|---|---|---|
| 8,802,328 B2 * | 8/2014 | Brandner | B22F 3/02 264/618 |
| 2003/0021715 A1 | 1/2003 | Glatz et al. | |
| 2003/0148160 A1 | 8/2003 | Song et al. | |
| 2006/0192323 A1 | 8/2006 | Zobl et al. | |
| 2011/0143261 A1 | 6/2011 | Brandner et al. | |

FOREIGN PATENT DOCUMENTS

| | | |
|---|---|---|
| CN | 102097629 A | 6/2011 |
| EP | 2337130 A1 | 6/2011 |
| JP | H0670161 A | 3/1994 |
| JP | H1040937 A | 2/1998 |
| JP | 2000021423 A | 1/2000 |
| JP | 2006062103 A | 3/2006 |
| JP | 2011129520 A | 6/2011 |
| WO | 0055931 A1 | 9/2000 |
| WO | 02055747 A1 | 7/2002 |

* cited by examiner

MOLDED PART

BACKGROUND OF THE INVENTION

Field of the Invention

The invention relates to a powder metallurgical molded part comprising a disk-like or plate-like main body and a multiplicity of knob-shaped and/or ridge-shaped elevations which are disposed next to one another in a row direction and thereby form a row and which have a height perpendicular to the main plane of the main body and which each have a cross section with two side flanks, which lead from an outer end contour, as seen in the height direction, of the elevation via rounded corner portions into curved portions with a curve radius, the curve radius merges into the surface contour of the main body, a rectilinear flank portion of the side flank or a tangent of the side flank lying at the point where the rounded corner portion merges into the curved portion is disposed at an angle of inclination with respect to the main plane of the main body, and elevations are disposed on at least one side of the two sides of the main body which lie opposite one another in the height direction.

EP 2 337 130 A1 discloses a molded part of this type. It is formed, for example, as an interconnector or an end plate for a fuel cell stack. Interconnectors or end plates of this type have the function of current collectors and have to simultaneously ensure reliable separation of the reaction gases between the anode side and the cathode side of adjacent fuel cells and the conduction of these reaction gases. For this purpose, interconnectors and end plates are configured as metallic plates or disks having knob-shaped and/or ridge-shaped elevations. These elevations are usually formed on one side of the main body in the case of end plates and on both, opposing sides of the main body in the case of interconnectors. The elevated structures are electrical contact regions with the electrochemically active fuel cell. The interstices between the individual knob-shaped and/or ridge-shaped elevations serve to conduct the reaction gases. The interconnector or the end plate has to have a high degree of sealing in order to ensure the reliable separation of the reaction gases between the anode side and the cathode side of adjacent fuel cells.

The production of the final shape of such interconnectors and end plates by material-removing machining from semi finished product is very costly. Alternatively, the molded parts can be manufactured by powder metallurgy, in which case pulverulent starting materials are pressed as far as possible into the final shape and then sintered.

Inherently rectangular cross sections would be optimal for the geometric form of the cross sections (i.e. the interstices between elevations which are arranged next to one another in a row) for the gas conduction, since they form a good compromise in terms of maximum contacting area while providing, at the same time, a sufficiently large cross section for the gas conduction. However, such shapes cannot be produced in practice by powder metallurgy, and therefore in practice trapezoidal cross sections having rectilinear, inclined flanks have become established. In powder metallurgy production, these flanks are usually connected by means of small transition radii firstly to an outer end contour, as seen in the height direction, of the elevation (corner radius) and secondly to the surface contour of the main body (curve radius), with a rectilinear flank portion of the flank or a tangent lying at the point where both transition radii of the same flank merge being arranged at an angle of inclination with respect to the main plane of the main body.

BRIEF SUMMARY OF THE INVENTION

The invention is based on the object of adapting the molded part for production which is simple in terms of manufacture and has process reliability.

This object is achieved by a powder metallurgical molded part including a disk-like or plate-like main body and a multiplicity of knob-shaped and/or ridge-shaped elevations which are disposed next to one another in a row direction and thereby form a row and which have a height perpendicular to the main plane of the main body and which each have a cross section with two side flanks, which lead from an outer end contour, as seen in the height direction, of the elevation via rounded corner portions into curved portions with a curve radius, the curve radius merges into the surface contour of the main body, a rectilinear flank portion of the side flank or a tangent of the side flank lying at the point where the rounded corner portion merges into the curved portion is disposed at an angle of inclination with respect to the main plane of the main body, and elevations are disposed on at least one side of the two sides of the main body which lie opposite one another in the height direction.

According to the invention, this is achieved by virtue of the fact that at least two different angles of inclination are present on the same side of the main body, wherein different angles of inclination also represent different geometries of the respectively associated elevations. In this way, at least a first geometry and a second geometry are present. It has surprisingly been identified that a combination of at least two different angles of inclination on one side of the main body can advantageously be utilized by manufacturing tools or pressing tools in order firstly to reach the required high material density with a small density gradient, i.e. a high homogeneity, of the finished molded part for reliable gas separation, and secondly to achieve de molding of the component without disruption and with process reliability. This makes it possible to achieve reliable gas separation by the molded part, with the complexity of the manufacturing tool being limited at the same time. This applies in particular for powder metallurgy production by means of pressing and sintering. This also makes it possible to use a cost-effective, single-stage pressing process in powder metallurgy production in order to achieve the high and uniform density of the molded part even with a single pressing operation. This is conventionally often not possible in the case of molded parts; particularly if these involve interconnectors and end plates which are used for oxide-ceramic high-temperature fuel cell stacks (solid oxide fuel cell or SOFC) and often contains alloys with high proportions of chromium as the material. However, alloys of this type are extremely brittle at low temperatures and can only be pressed with great difficulty, or have to be processed using a costly, multi-stage pressing process.

Different angles of inclination make it possible to geometrically adapt the pressing tool for powder metallurgy production in such a manner as to achieve improved demolding of the compact from the pressing tool without disruptive frictional forces between the surfaces of the compact, in particular the elevations thereof, and the pressing tool itself. Relative movements between the negative mold of the manufacturing tool and the molded part to be pressed advantageously do not have a manufacturing-related influence on the defined final geometry and mechanical integrity of the component, the pressed density and also the pressed density gradient of the molded part also being provided to an adequate extent. The different angles of inclination therefore contribute to a particularly high-quality molded part. The positioning of the elevations with different geometries can be defined individually in the row direction, depending on the manufacturing tool used, in particular the pressing tool or pressing punch. The number of defective molded parts is reduced. On the other hand, it is possible to take into account different defined geometries on the manufacturing tool with relatively little cost.

The demolding between compact and pressing tool can be additionally improved in many applications if the angle of inclination of the second geometry is larger than the angle of inclination of the first geometry.

The first geometry is preferably represented by at least one of the following physical parameters and the values thereof:

The angle of inclination $\alpha 1$, $\alpha 1'$ lies in the range of 95° to 135°, in particular 95° to 120° and further preferably 95° to 110°.

The curve radius R1, R1' lies in the range of 0.15 to 1 mm, in particular 0.3 to 1 mm.

The ratio of the curve radius R1, R1' to the height h (R:h) lies in a range of 0.25 to 1, in particular 0.5 to 1, further preferably 0.7 to 1.

Aside from different angles of inclination, the different geometries provided can also have different curve radii and/or different heights for one or more elevations. The rounded corner portions between the outer end contour of the elevation and the side flank are preferably equipped with a corner radius r. In this case, a further possible way of providing different geometries consists in defining different corner radii r.

In accordance with another feature of the invention, the angle of inclination of the first geometry lies in a range of 95° to 135°, the angle of inclination of the second geometry lies in a range of 135° to 150° and side flanks of adjacent elevations have different angles of inclination. These proposed suitable angles of inclination additionally promote the realization of the required density and homogeneity of the molded part. In the case of relatively large angles of inclination, the elevation has relatively flat side flanks. The reduction in channel cross section which is possibly brought about thereby between two directly adjacent elevations for gas conduction can be compensated for by a correspondingly modified dimensioning of other parameters of the geometry, in particular the height and/or the corner radius and/or the curve radius.

In accordance with a further feature of the invention, the two side flanks of the same elevation have different angles of inclination and the side flank facing toward an end of the row of elevations in the row direction has a greater angle of inclination than the side flank facing toward the center of the row of elevations. Accordingly, at least one elevation has an asymmetrical cross section. This avoids any shearing loads resulting from relative movements between the pressing tool and the compact (i.e. the molded part to be shaped), e.g. during demolding. The required gas tightness is therefore additionally promoted over the entire cross-sectional area of the main body.

In accordance with an added feature of the invention, at most 50% of the total number of elevations have the second geometry and at most 30% of the total number of elevations have the second geometry. Thus, it is preferable that at least 50%, in particular at least 70%, of the total number of elevations arranged next to one another in a row in a row direction on one side of the main body have a first geometry. Depending on the pressing tool used and/or the size of the main body in the main plane thereof, even individual elevations with a second geometry can be sufficient for reliably achieving a uniform pressed density for all elevations and for simultaneously ensuring good demolding properties.

In accordance with an additional feature of the invention, the first geometry and/or the second geometry is present at a plurality of directly adjacent elevations along the row direction of the row of elevations and the directly adjacent elevations of the first geometry are arranged in a central portion of the row of elevations. These features claims 10 and 11 propose a plurality of directly adjacent elevations along the row direction with the same geometry. As a result of this, the pressing tool can be adapted to different segments of the main body in a targeted manner, in order to avoid disruptive influences during pressing and demolding.

In accordance with yet another feature of the invention, an outer portion of the row of elevations remote from the center of the row of elevations has at least one elevation with the second geometry. It is preferable that the second geometry is realized on at least one elevation which is arranged in an outer portion of the row of elevations on one side of the main body. This promotes the cost-effective production of molded parts with a relatively large plate or disk cross section in the main plane of the main body if the high density required, with a small density gradient, is to be ensured primarily in the case of relatively long rows of elevations in outer portions of the row direction.

In accordance with yet a further feature of the invention, the elevation of the first geometry has a height which is smaller than the height of an elevation of the second geometry, the curve radius of an elevation of the second geometry is smaller than 0.15 mm and the ratio of curve radius to height R:h of an elevation of the second geometry is less than 0.25. These features propose preferred measures and ranges for the formation of the geometrical parameters of height and curve radius. As a result of these, the channel cross section which is initially reduced by larger angles of inclination and therefore flatter side flanks in the region of the second geometry can at least be compensated for again to the extent that it corresponds at least to the channel cross section in the region of the first geometry. In spite of the geometrical variation in the molded part compared to conventional components, the gas conduction capability is therefore maintained, if the molded part is used for example in a fuel cell.

In accordance with a concomitant feature of the invention, the molded part is an interconnector or an end plate for electrically connecting electrochemical cells. This feature proposes preferred possible uses of the molded part according to the invention. Both in the case of the interconnector and in the case of the end plate, what are known as current collectors are involved.

The interconnector is usually arranged between two cells of a cell stack, whereas the end plate is arranged at one end of the cell stack. At least one of the two sides of the main body (anode side and/or cathode side) of the molded part has a row of elevations with at least two different geometries. The gas tightness of the interconnector or of the end plate which is easily ensured in manufacturing terms by means of the different geometries inexpensively improves the long-term behavior and the performance of the cell stack. The electrochemical cell is, in particular, a solid electrolyte fuel cell also called SOFC (Solid Oxide Fuel Cell) or a cell for electrolysis applications, in particular high-temperature electrolysis.

BRIEF DESCRIPTION OF THE SEVERAL VIEWS OF THE DRAWING

The invention will be explained in more detail with reference to the exemplary embodiments shown in the drawings, in which.

DESCRIPTION OF THE INVENTION

Figure 1:
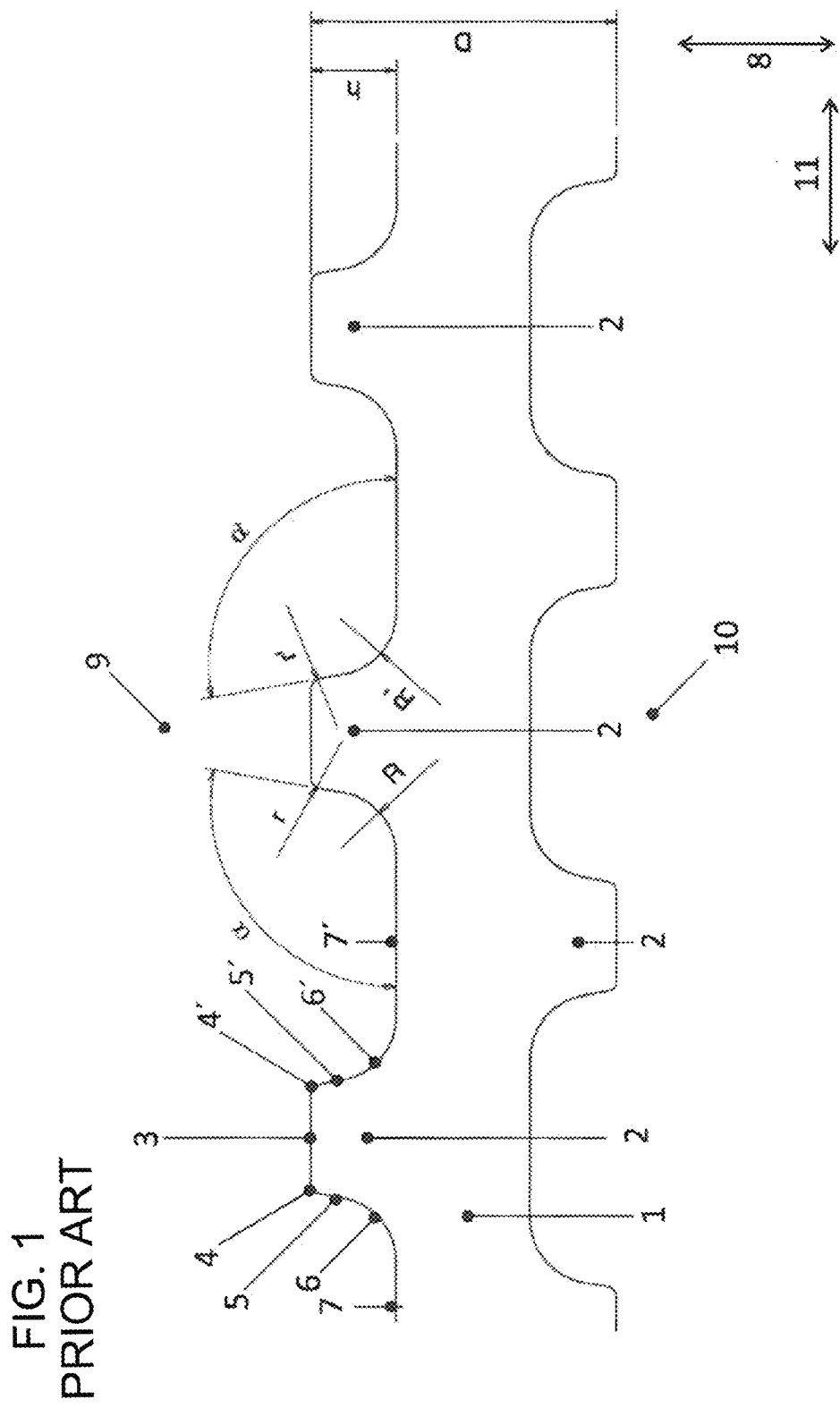
FIG. 1: shows an enlarged-scale, schematic and sectional side view of a detail of a previously known interconnector.

FIG. 1 schematically shows, on an enlarged scale and in section, a detail of an interconnector known from EP 2 337 130 A1 for a fuel cell stack. The interconnector has a plate-shaped main body 1 with elevations 2 on both sides of the main body 1, which lie opposite in the height direction 8. The sectionally trapezoidal elevations 2 with the height h, which can be formed in a knob-like manner, in a continuously ridge-like manner or else in a ridge-like manner in segments over the entire extent of the interconnector, form, by virtue of their channel-like interstices between in each case two directly adjacent elevations 2, the channels for the gas conduction of the interconnector. The outer end contour 3, as seen in the height direction 8, of each elevation 2 merges via a rounded corner portion 4 or 4' with a corner radius r or r' into inclined side flanks with a rectilinear flank portion 5 or 5'. The rectilinear portions 5 or 5' then merge into curved portions 6 or 6' with a curve radius R or R'. These then in turn merge, without interruption, into the surface contour 7 or 7' of the main body 1. End contours 3 lying opposite one another in the height direction 8 delimit a thickness D of the interconnector. The inclined side surfaces include an angle α or α' with the surface contour 7 or 7' of the main body 1. It would likewise be conceivable for the rounded corner portions 4 or 4' to lead directly without the intermediate rectilinear flank portions 5 or 5' into the curved portions 6 or 6' if there are curved portions 6 or 6' having very large radii R or R' and small height dimensions h of the elevations 2. In this case, the tangent at the transition of the rounded corner portions 4 or 4' into the curved portions 6 or 6' includes the angle of inclination α or α' with the surface contour 7' or 7 of the main body 1.

Figure 2:
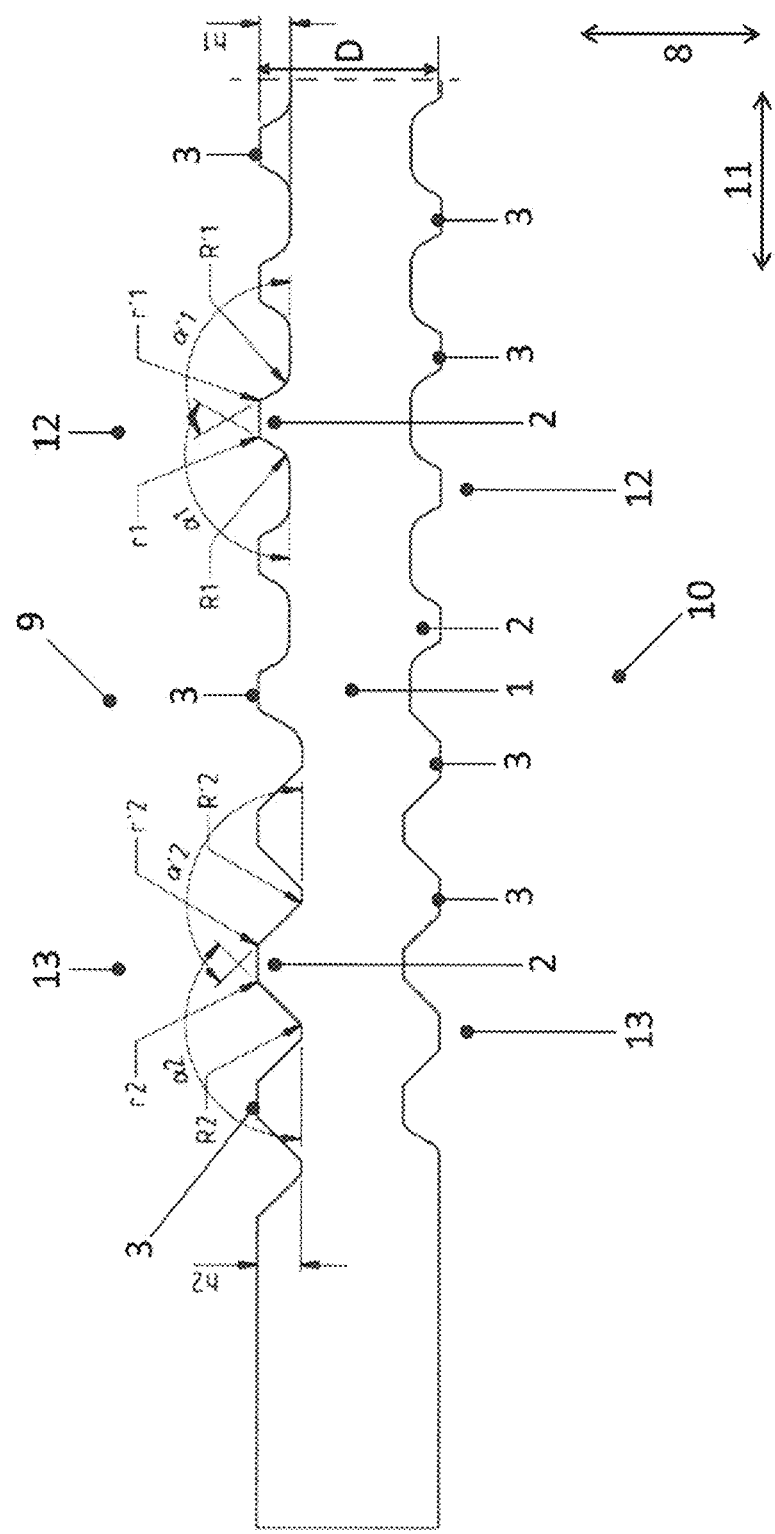
FIG. 2: shows an enlarged-scale, schematic and sectional side view of a detail of an interconnector according to the invention.

In the case of the interconnector shown schematically in detail in cross section in FIG. 2, a plurality of elevations 2 are arranged in each case on a first side 9 and on a second side 10, lying opposite in the height direction 8, of the main body 1. They are arranged next to one another in a row in a row direction 11 running parallel to the main plane of the main body 1. Elevations 2 with a first geometry are arranged in a central portion 12 of the row of elevations, whereas a plurality of elevations 2 with a second geometry are formed in an outer portion 13 remote from the center of the row of elevations. In principle, two different geometries are realized on each side 9, 10 of the main body 1, where the first geometry on both sides 9, 10 and/or the second geometry on both sides 9, 10 do not have to be identical in each case. Alternatively, it is also possible for only one side 9 or 10 of the interconnector to have a second geometry in addition to the first geometry.

In FIG. 2, the reference signs 4, 4', 5, 5', 6, 6', 7, 7' have been omitted, as compared with FIG. 1, merely for the sake of simplicity of drawing, even if the structural configuration of the elevations 2 as shown in FIG. 2 has or can have in principle the features of these omitted reference signs as shown in FIG. 1.

In FIG. 2, the angle of inclination α1 or α1' of the first geometry is 120°. The angle of inclination α2 or α2' of the second geometry in the outer portion 13 is 135°. In an outer portion 13, the two side flanks 5 of the same elevation 2 preferably have different angles of inclination α2 or α2', it then being the case in particular that the angle of inclination α2' which faces toward the center of the row of elevations or the central portion 12 is smaller than the angle of inclination α2 which faces toward one end of the row of elevations or an outer portion 13.

In both rows of elevations, the outer end contours 3 of the elevations 2 each lie in a plane running parallel to the main plane of the main body 1. At the same time, the height h1 of the elevations 2 in the central portion 12 is smaller than the height h2 in the outer portion 13. In other words, the corresponding surface contours 7 of the main body 1 are arranged offset in the height direction 8 in the region of the outer portion 13, on the one hand, and in the region of the central portion 12, on the other hand.

Molded parts were produced as interconnectors by powder metallurgy. A pressing tool was used to press the components in such a manner that at least a central portion of the two rows of elevations lying opposite one another in the height direction 8 had a first geometry. Whereas one row of elevations is assigned to a cell cathode, the second row of elevations is assigned to a cell anode. Three elevations 2 with a second geometry were present at the two outer portions 13 of each row of elevations. 88% of the total number of elevations 2 had the first geometry. The most important geometrical parameters of these interconnectors are reproduced below.

On the cathode side, the following geometries were realized for the elevations 2:

| Parameter | Elevations with first geometry | Elevations with second geometry |
| --- | --- | --- |
| Angle of inclination α | 110° | 140° |
| Height h | 0.4 mm | 0.7 mm |
| Curve radius R | 0.35 mm | 0.05 mm |
| Ratio R:h | 0.875 | 0.071 |
| Corner radius r | 0.05 | 0.05 |

On the anode side, the following geometries were realized for the elevations 2:

| Parameter | Elevations with first geometry | Elevations with second geometry |
| --- | --- | --- |
| Angle of inclination α | 110° | 140° |
| Height h | 0.4 mm | 0.6 mm |
| Curve radius R | 0.35 mm | 0.05 mm |
| Ratio R:h | 0.875 | 0.083 |
| Corner radius r | 0.05 | 0.05 |

Interconnectors formed in this way showed a high degree of homogeneity of the material density, i.e. a small density gradient, over all the elevations along a row of elevations, and therefore a single-stage pressing process is advantageously sufficient for production.

Figure 3:
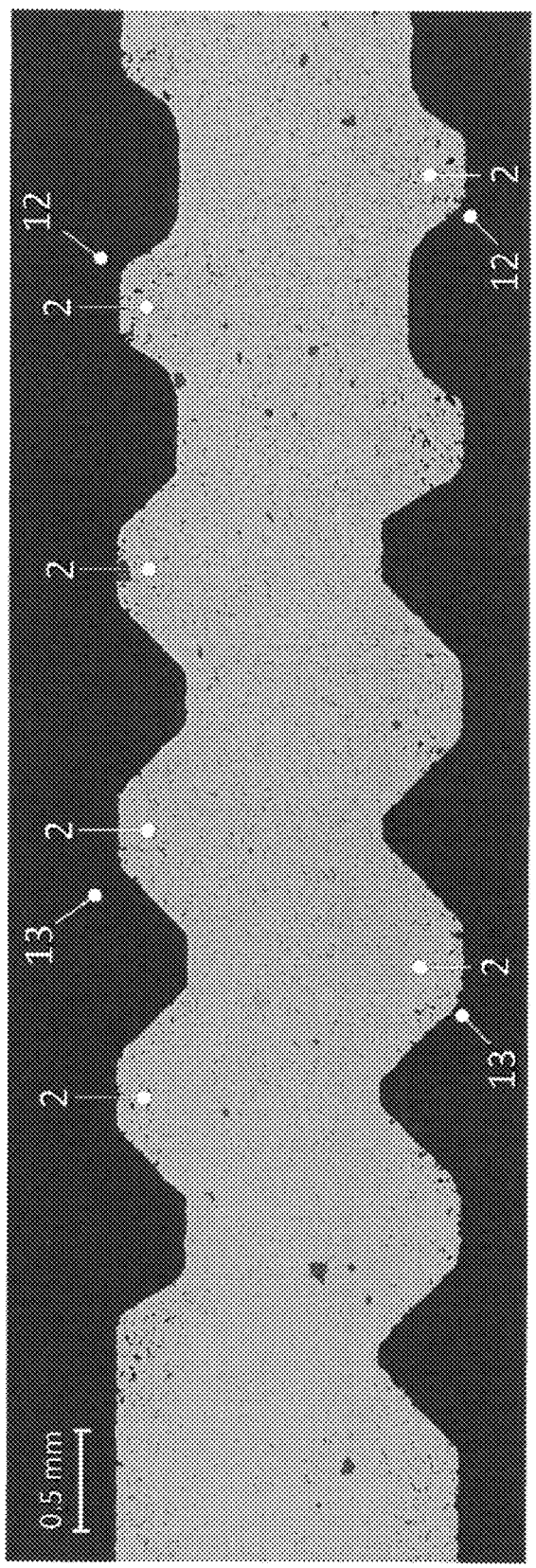
FIG. 3: shows a scanning electron microscope image of a transverse micro section of an interconnector according to the invention.

An example of an interconnector produced by powder metallurgy can be gathered from FIG. 3. The two different geometries of the elevations 2 in an outer portion 13 and a central portion 12 of the row of elevations are readily identifiable.

To produce the molded parts having the two geometries mentioned above, use was made, for example, of a powder batch consisting of 95% by weight Cr powder and 5% by weight of an FeY master alloy (alloy comprising 0.5% by weight Y). 1% by weight of a pressing aid (wax) was added to this powder batch. Then, this powder batch was mixed in a tumble mixer for 15 minutes. A pressing tool was equipped with a pressing punch according to the different geometries described above. The pressed powder, i.e. the compact, was presintered at 1100° C. for 20 minutes in a hydrogen atmosphere in a continuous belt furnace for the purpose of dewaxing. This was followed by high-temperature sintering of the component at 1400° C. for 7 hours in a hydrogen atmosphere for the purpose of further compaction and alloy formation. This was followed by preoxidation of the component at 950° C. for a period of time of 10 to 30 hours in order to close up residual porosity which may be present to an extent that the permeability of the material is sufficiently low. Then, the surfaces of the component were freed of the oxide layer by a sand blasting process on all sides.

Figure 4:
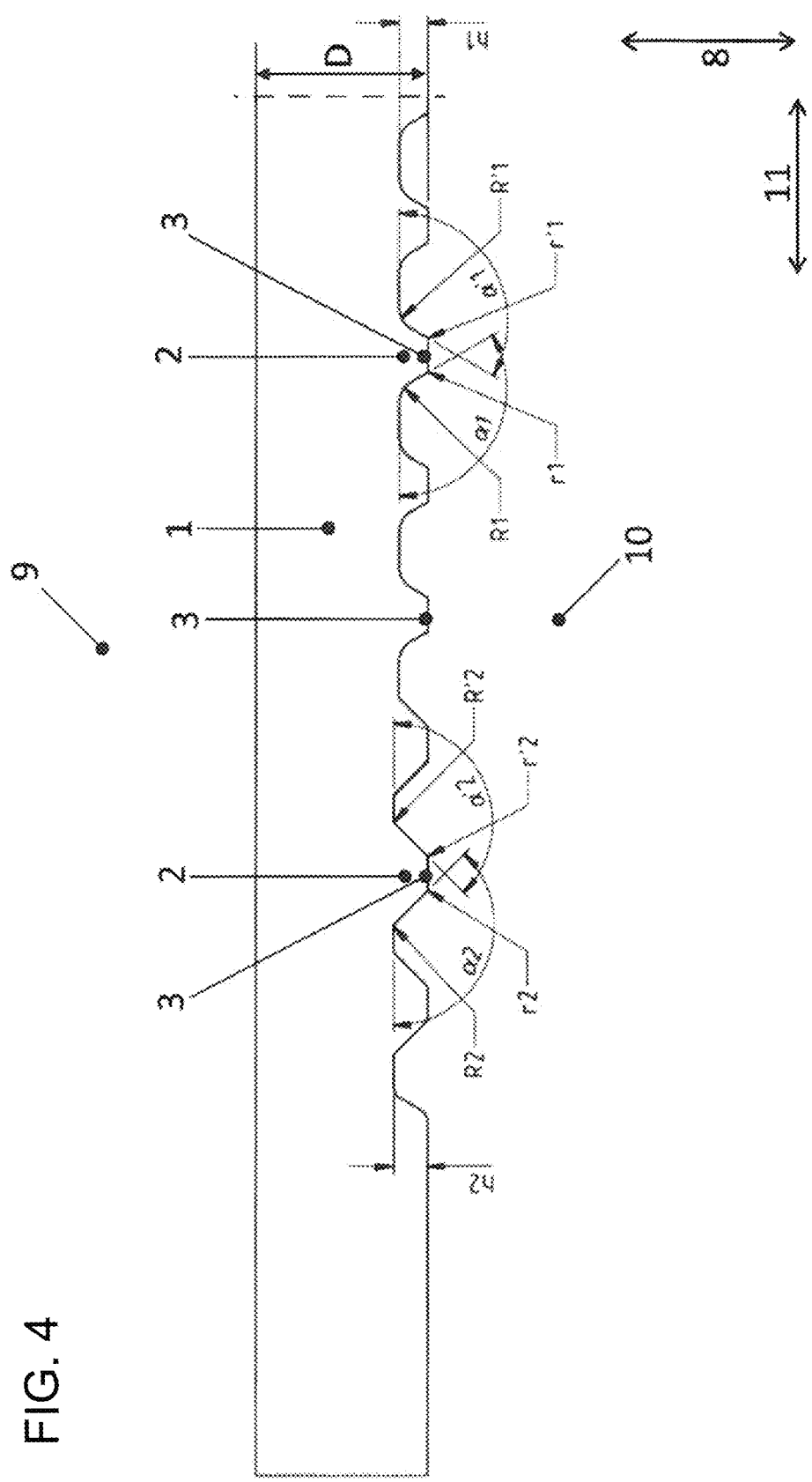
FIG. 4: shows an enlarged-scale, schematic and sectional side view of a detail of an end plate according to the invention.

FIG. 4 schematically shows, on an enlarged scale and in section, the detail of an end plate according to the invention for a fuel cell stack. The elevations (2) are in principle configured in the same way as in the case of the interconnector shown in FIG. 2, but in contrast to FIG. 3 only on one side 10 of the main body as considered in the height direction 8.

The invention claimed is:
1. A powder metallurgical molded part, comprising:
  a disk-shaped or plate-shaped main body having a main plane, two sides lying opposite one another in a height direction and a surface contour; and
  a multiplicity of elevations disposed on at least one of said two sides of said main body, said elevations having at least one of a knob shape or a ridge shape, and said elevations disposed next to one another in a row direction, forming a row and having a height perpendicular to said main plane of said main body;
  said elevations each having a cross section with two side flanks leading in said height direction from an outer end contour, through rounded corner portions into curved portions with a curve radius merging into said surface contour of said main body;
  said side flanks each having:
    a rectilinear flank portion, or
    a tangent of said side flank lies at a merging point where a rounded corner portion merges into a curved portion;
  said rectilinear flank portion or said tangent disposed at an angle of inclination relative to said main plane of said main body;
  angles of inclination on a same one of said two sides of said main body including at least two different angles of inclination, and said at least two different angles of inclination representing at least a first geometry and a second geometry.

2. The molded part according to claim 1, wherein said angle of inclination of said second geometry is larger than said angle of inclination of said first geometry.

3. The molded part according to claim 1, wherein said angle of inclination of said first geometry lies in a range of 95° to 135°.

4. The molded part according to claim 1, wherein said angle of inclination of said second geometry lies in a range of 135° to 150°.

5. The molded part according to claim 1, wherein said side flanks of adjacent elevations have different angles of inclination.

6. The molded part according to claim 1, wherein said two side flanks of the same elevation have different angles of inclination.

7. The molded part according to claim 6, wherein said row direction of said row of elevations defines ends and a center of said row, and one of said side flanks facing toward one of said ends of said row has a greater angle of inclination than another of said side flanks facing toward said center of said row.

8. The molded part according to claim 1, wherein at most 50% of a total number of said elevations have said second geometry.

9. The molded part according to claim 8, wherein at most 30% of said total number of said elevations have said second geometry.

10. The molded part according to claim 1, wherein at least one of said first geometry or said second geometry is present at a plurality of directly adjacent elevations along said row direction of said row of elevations.

11. The molded part according to claim 10, wherein said row of elevations has a central portion, and said directly adjacent elevations of said first geometry are disposed in said central portion.

12. The molded part according to claim 1, wherein said row of elevations has a center and an outer portion remote from said center, and said outer portion has at least one elevation with said second geometry.

13. The molded part according to claim 1, wherein said height of an elevation with said first geometry is smaller than said height of an elevation with said second geometry.

14. The molded part according to claim 1, wherein said curve radius of an elevation with said second geometry is smaller than 0.15 mm.

15. The molded part according to claim 1, wherein an elevation of said second geometry, has a ratio of said curve radius to said height of less than 0.25.

16. The molded part according to claim 1, wherein the molded part is an interconnector or an end plate for electrically connecting electrochemical cells.

* * * * *